3,684,556
Patented Aug. 15, 1972

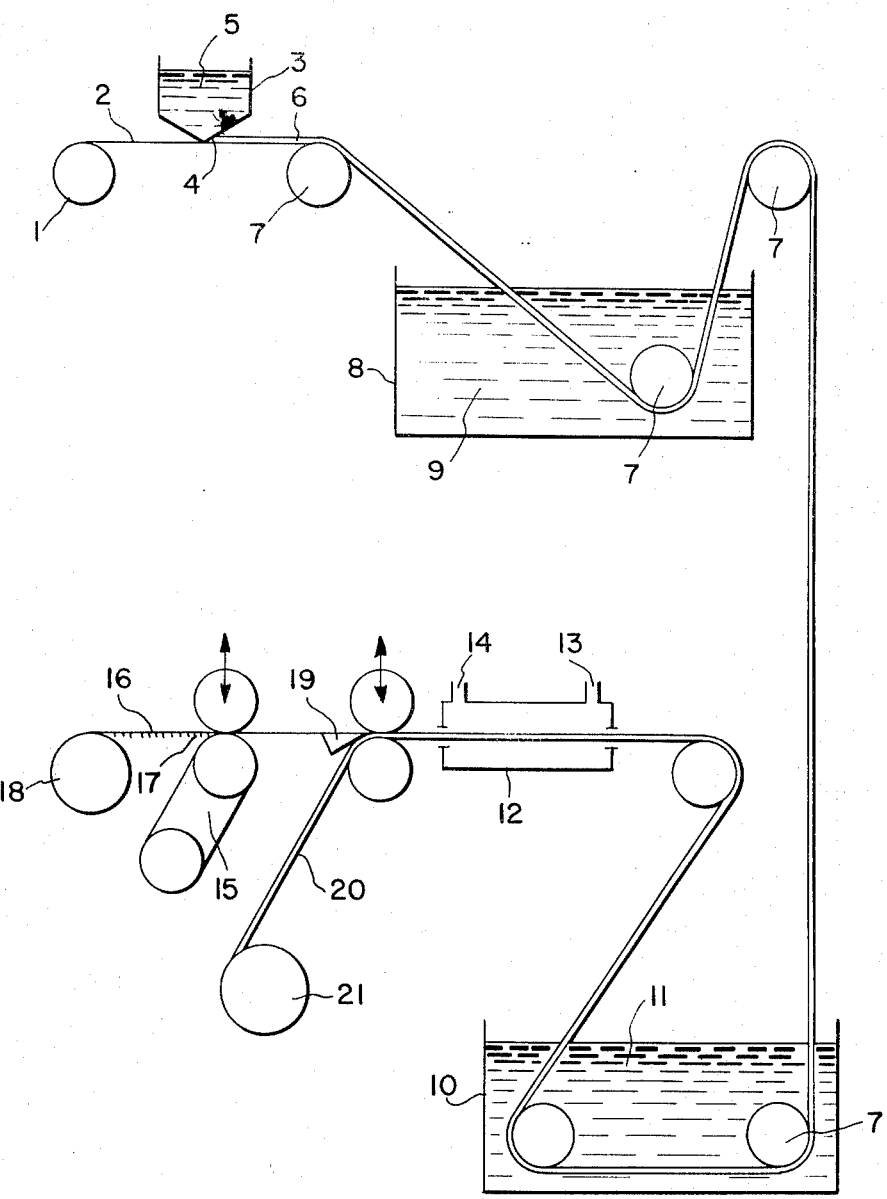

3,684,556
PROCESS FOR THE PRODUCTION OF A FLEXIBLE SYNTHETIC, GAS-PERMEABLE, MULTILAYER SHEET MATERIAL HAVING A NAPPED OUTER SURFACE
Hans Mahl, Wiesbaden, and Heinrich Lind, Diedenbergen, Germany, assignors to Kalle Aktiengesellschaft, Wiesbaden-Biebrich, Germany
Filed Aug. 10, 1970, Ser. No. 62,483
Claims priority, application Germany, Aug. 11, 1969, P 19 40 772.8
Int. Cl. B44d 1/44
U.S. Cl. 117—63                                 7 Claims

ABSTRACT OF THE DISCLOSURE

This invention relates to a process for the production of a flexible, gas-permeable, multilayer sheet material, and to the material so produced, which process comprises applying a liquid layer of a solution containing up to 28 percent by weight of polyurethane in an organic solvent miscible with water to one surface of a fibrous sheet material, applying a liquid precipitating agent to the layer at a temperature not in excess of 5° C., washing the resulting coagulated polymer layer, drying and cooling the polymer layer, and grinding the outer surface of the polymer layer.

---

The present invention relates to a process for the production of a flexible, synthetic, gas-permeable, multilayer sheet material comprising a flexible, porous, fibrous, textile sheet material and, on one surface thereof, a gas-permeable layer of a polymer material the outer surface of which is napped, the fibrous nap particles being microporous.

More particularly, the present invention relates to a process for the production of a flexible, gas-permeable, multilayer sheet material which comprises a porous, fibrous, textile sheet material based on synthetic fibers and, on one surface of the fibrous sheet material, a flexible, microporous layer based on a polyurethane, the outer surface thereof having a fibrous nap, the fibrous nap particles of which are microporous and of the same chemical composition as the polymer layer.

Still more particularly, the present invention relates to a continuous process for the production of a multilayer material of the above-mentioned type. The present invention also relates to a multilayer material produced according to the process.

A multilayer material produced according to the process of the invention has the character of suede leather on one of the surfaces thereof.

The flexible, gas-permeable, multilayer sheet material produced in accordance with the invention may be used instead of velvet leather, suede leather or nubuk leather as a material for shoe uppers or garments or for the production of fancy leather articles.

A gas-permeable layer means a layer which is permeable to water vapor and gases but substantially impermeable to water.

The expression "nap" means a plurality of closely neighbored fibrous particles outwardly projecting from the plane of the fiber support and firmly connected with the fiber support. The "fiber support" means a microporous, flexible, synthetic, sheet material of the same chemical material as the nap fiber itself.

Over the lengths thereof, the nap particles may have the same or substantially the same cross-sections. They also may have variable cross-sections over the lengths thereof, however. The nap also may be formed from particles of both kinds.

The nap particle are homogeneously connected with the microporous polymer layer without mechanical means or additional chemical binders; the nap particles are microporous. Additional binders mean binders having a chemical structure other than that of the polymer layer.

The known suede leather-like materials based on synthetic multilayer materials have a brittle feel different from that of natural suede leather because of their cellular or tubular surface structure and the use of a large quantity of polyvinyl chloride in the polyurethane.

The known multilayer materials with suede leather-like surfaces are produced by coagulating a layer low in solids, and consisting of a polyurethane solution, on a suitable porous substrate and grinding the top layer thereof.

Polymer solutions high in solids do not lead to the formation of a layer during coagulation as is necessary for the formation of a nap after grinding the top layer thereof. The layer does not have the cellular structure required.

Layers of polymer solutions low in solids, however, may be coagulated according to the known process to form layers having the required pore structure only when the polymer solution contains a large quantity of polyvinyl chloride. When working under the known process conditions with a polymer solution of a solids content of less than 30 percent by weight, which contains less than 5 percent by weight of polyvinyl chloride or of other polymers chemically different from polyurethane, calculated on the total content of polymer, coagulation of the layer involves considerable surface shrinkage, which becomes apparent in a wavy layer material, and renders the multilayer material useless.

The high polyvinyl chloride content of the known polymer solution low in solids, however, has the disadvantage that it produces a brittle feel in the end product.

The present invention overcomes the disadvantages of the known processes and provides a process for the production of a flexible, gas-permeable multilayer sheet material comprising a fibrous textile sheet material having, on one surface thereof, a microporous, gas-permeable polymer layer having an outer surface provided with a nap from particles of microporous structure of the same material as the polymer layer.

This is achieved by a process for the production of a flexible, gas-permeable, multilayer sheet material comprising a flexible, fibrous, textile sheet material as a support having on one surface thereof a gas-permeable layer of polyurethane the outer surface of which has a nap of fibrous particles of polyurethane, in which process the fibrous sheet material is coated with a layer of polyurethane solution, a liquid precipitating agent is applied thereto, the coated sheet material is dried and cooled and the top layer is ground. In the process, a liquid layer of a solution containing up to 28 percent by weight of polyurethane in an organic solvent miscible with water is applied to one surface of the fibrous sheet material, a liquid precipitating agent at a temperature of at most 5° C. is caused to act on the layer, washing liquid is applied to the coagulated polymer layer, the coated sheet material is dried, and the polymer layer is cooled and then ground and fluffed on the outer surface or, if desired, the top layer is split-off before grinding and fluffing.

Suitable porous, fibrous, textile sheet materials are woven and knitted fabrics, felts or fiber fleeces with un-oriented or oriented fibers.

The textile sheet materials may comprise synthetic or natural fibers, and also mixtures of both fiber types. Preferably used are fiber fleeces of synthetic fibers.

Suitable fibers for the production of the fibrous sheet materials are those of polyacrylonitrile, polyamide, polyvinylidene chloride, polyvinyl chloride, regenerated cellulose, and preferably polyester.

Suitable natural fibers are those of animal hair, cotton, jute, linen, flax or hemp, as well as of mixtures of these materials.

Suitable fiber fleeces of which the fibers are irregularly arranged or have a preferred direction in the fleece are fiber fleeces, particularly needled fiber fleeces of synthetic fibers, a portion of the fibers being heat-shrinkable synthetic fibers. Suitable fiber fleeces also may be mixtures of at least two chemically different synthetic fibers. It is possible in this case that only that fiber portion based on the same chemical material consists entirely or partially of heat-shrinkable fibers. The fleece fibers have a titer in the range of 0.5 to 5 denier. The surface weight of suitable fleeces is in the range of 50 to 1,000 g./m.². Preferably used are matted fiber fleeces of the type described.

Preferable polymers for the preparation of the polymer solution are polyurethanes or mixtures of polyurethanes with polymers of the vinyl series, e.g. polyvinyl chloride or polyvinyl acetate, the solids content of the vinyl polymers being less than 5 percent by weight of the total polymer solids content. The polymer solution also may contain commercial pigments.

Suitable solvents for the preparation of the liquid polymer solution are organic solvents, advantageously those miscible with water, preferably strongly polar solvents, e.g. dimethyl acetamide and N-methyl-pyrrolidone, as well as dimethyl sulfoxide, and most preferably, dimethyl formamide.

The liquid polyurethane solution has a polymer solids content in the range of 15 to 28 percent by weight, preferably in the range of 20 to 27 percent by weight, calculated on the total weight of the solution. At 20° C., the polyurethane solution has a viscosity in the range of 5,000 to 60,000 cp., preferably in the range of 10,000 to 50,000 cp.

If required, it also is possible to use a polymer solution of which not more than 5 percent of its solids content consists of polyvinyl chloride.

Layers of polyurethane solution having the given polymer solids concentration or polyurethane solutions of the indicated concentration which, in addition to the polyurethane, have a content of polyvinyl chloride of the indicated low concentration cannot be employed for the preparation of suede leather-like nap of the required layer structure on the support material after coagulation under known process conditions.

Suitable precipitating agents for the coagulation of the liquid polymer solution are liquid media incapable of dissolving the polymer contained in the polymer solution but miscible with the solvent used for dissolving the polymer. Preferred precipitating agents are water or mixtures of water and dimethyl formamide. The dimethyl formamide content of such mixtures advantageously is below 10 percent by weight.

A suitable medium for removing residues of solvent and precipitating agent from the multilayer material by washing the web is water.

The process is performed in a manner such that a liquid layer of a solution of polyurethane in an organic solvent miscible with water is applied to a surface of a fibrous textile sheet material by means of a suitable application device. An advantageously used application device is a container with a slot die which is connected to a supply container for the liquid polymer solution. The slot of the container extends rectangularly to the lateral edges of the fibrous sheet material. The coated fibrous sheet material is then introduced into a container containing liquid precipitating agent. After coagulation of the polymer solution by means of the precipitating agent, the fibrous, textile sheet material provided with a microporous layer of polyurethane is introduced into another container filled with washing liquid. In this container, the coated fleece is freed or substantially freed from residues of solvent or precipitating agent by washing. After leaving the washing bath, the coated fibrous sheet material is dried. The outer surface of the polymer layer is a coherent film. The film of the polymer layer is then advantageously split-off by means of a suitable known splitting device provided with a splitting knife and the resulting new surface of the porous polyurethane layer on the fibrous sheet material is then fluffed by sandpapering by means of a known grinding device. It also is possible to grind the polymer layer to such an extent that the surface film is destroyed and the porous layer below is fluffed.

The flexible, gas-permeable, multilayer sheet material produced according to the process of the invention has a surface of a suede leather-like appearance and a soft leather-like feel.

The polymer solution is applied at a wet-layer thickness in the range of 0.5 to 3 mm., particularly in the range of 1 to 2 mm.

The temperature of the liquid precipitating agent is important for the performance of the process; it is thus necessary in the process for the liquid precipitating agent to act upon the layer of polymer solution to be coagulated at a temperature of at most 5° C. The time of action of the liquid precipitating agent at this temperature on the layer of polymer solution on the support material is 20 minutes to 4 hours, preferably 20 minutes to 120 minutes.

The temperature at which the coated multilayer material is dried is not important if it does not exceed 200° C.

The top film of the polymer layer is split-off by means of a splitting knife and the thus bared surface of the polymer layer is ground by means of abrasive paper.

The top layer of the polymer layer means that zone of the polymer layer which forms the outer boundary surface thereof and is a coherent, substantially microporous, very thin film the inner surface of which is adjacent a macroporous layer.

The accompanying drawing is a diagrammatic view illustrating a specific embodiment of the invention, i.e. a continuous process.

Referring to the drawing, numeral 1 designates a supply roll, numeral 2 is a flexible, fibrous, textile fleece web, numeral 3 is a pouring box positioned above the surface of the textile web support and having at its lower end a straight pouring slot 4 of a width substantially corresponding to the width of the fiber web and extending perpendicularly to the longitudinal direction of the web. The pouring slot has a width of 1.5 mm.; the distance of the slot aperture from the surface of the fleece web is 1.5 mm. Numeral 5 designates the polyurethane solution in the pouring box 3. Numeral 6 designates the liquid layer of polyurethane solution applied to the textile web support 2, numeral 7 designates a guide roll, numeral 8 designates a tank containing the precipitating liquid 9, numeral 10 designates a tank containing the washing liquid 11, numeral 12 designates a hot-air drying channel with an inlet 13 and an outlet 14 for hot air, numeral 15 designates a grinding device, 16 designates the web material with the fibrous nap 17, numeral 18 designates a supply roll onto which the finished web material is wound, numeral 19 designates a splitting device for splitting-off the top film of the polymer layer, numeral 20 designates the split-off top film, and numeral 21 designates a supply roll onto which the top film 20 is wound.

The invention will be further illustrated by reference to the following specific examples in which parts are by weight:

EXAMPLE 1

For the preparation of a polymer solution, 736 parts of diphenylmethane-4,4-diisocyanate are melted and stirred for 45 minutes at 50° C. with 1,770 parts of a polyester (from adipic acid and 4,4'-dioxydibutylether, molecular weight 1,500, OH number 73). The preadduct obtained is dissolved in 6,920 parts of dimethyl formamide and cooled to 32° C. To the preadduct solution, there are added 603 parts of a 5.12 percent by weight solution of water in dimethyl formamide and the mixture is stirred for 5 hours at 30° C. The polymer solution obtained is freed from gas and has a polymer solids content of 25 percent by weight of polyurethane. The viscosity of the solution is 15,000 cp. at 20° C. After the gas has been removed from the polymer solution under reduced pressure, a web of matted fiber fleece is continuously doctored with this solution on one surface at a wet-layer thickness of 1.5 mm., the web consisting of polyethylene terephthalate fibers of a thickness of 1.2 denier, having a surface weight of 200 g./m.$^2$, being bonded with a binder consisting of a synthetic rubber dispersion based on an aqueous dispersion of a butadiene/acrylonitrile/acrylic acid copolymer (e.g. Perbunan N, registered trademark of Farbenfabriken Bayer, Leverkusen, Germany), produced by carding and predensified by needling with 400 stitches/cm.$^2$, and advanced at a constant speed in the web direction. The coated material is then passed through a water bath at 3° C.; the dwell time in the bath is 120 minutes. After coagulation of the polymer solution and formation of the polymer layer, the coated web support is continuously introduced into another tank containing water. In this tank, the coated web support is washed out. After the washing procedure, the coated web support is passed through a hot-air drying cabinet and dried therein at 100° C. The coherent top film of the polymer layer is then continuously split-off by a conventional splitting machine and removed and the bared surface of the polymer layer is fluffed by grinding. The resulting flexible multilayer material has a surface of a suede leather-like appearance and a leather-like soft feel. The multiplayer material has the following air and water vapor permeability characteristics:

Air permeability 15,810 cm.$^3$/dm.$^2$·24 hours; water vapor permeability 1.6 mg./dm.$^2$·1 hour; water permeability 1 kg./cm.$^2$. It is suitable as a material for shoe uppers and garments as well as for the production of fancy leather articles.

EXAMPLE 2

A polymer solution prepared according to Example 1 is stirred with 200 parts of carbon black (Printex U, registered trademark of Degussa, Frankfurt am/Main, Germany). The pasty polymer solution has a viscosity of 16,000 cp. at 20° C. The polymer solids content thereof is 24.5 percent by weight calculated on the total weight of the solution. Further processing is the same as that described in Example 1.

The resulting flexible multilayer material with a black suede leather-like outer surface has a soft leather-like feel and is permeable to air and water vapor. The material is suitable for the production of shoe uppers and garments as well as for the production of fancy leather articles.

EXAMPLE 3

A polymer solution prepared as described in Example 1, first paragraph, is stirred with 100 parts of polyvinyl chloride. The polymer solution has a polymer solids content of 25.7 percent by weight. The polyvinyl chloride content in the total polymer is 3.85 percent by weight.

The process is performed with this paste according to Example 1. The resulting flexible multilayer material has a surface of a suede leather-like appearance and a soft leather-like feel. The material is permeable to air and water vapor as indicated by the characteristics of Example 1 and is suitable for the production of shoe uppers and garments as well as for the production of fancy leather articles.

EXAMPLE 4

The process is performed as described in Example 1 but with the exception that the polymer solution is applied to a fabric of polyester fibers. The fabric is characterized by the following data:

Titer (denier)—69/25/300, 69/25/300
Twill weave—2/2
Adjustment (threads/cm.)—36/36
Weight per m.$^2$—70 g.

The permeability properties of the coated fabric are the same as those indicated in Example 1 for the coated fleece.

EXAMPLE 5

Under the process conditions of Example 1, a polyester fabric of the following characteristics is coated with the polymer solution described in Example 1.

Titer (denier)—1000/200/60, 1000/200/60
Basket weave—2/2
Adjustment (threads/cm.)—14/15
Weight per m.$^2$—350 g.

The permeability properties of the coated fabric are the same as those indicated in Example 1 for the coated fleece.

It will be obvious to those skilled in the art that many modifications may be made within the scope of the present invention without departing from the spirit thereof, and the invention includes all such modifications.

What is claimed is:

1. A process for the production of a flexible, gas-permeable, multilayer sheet material which comprises applying a liquid layer of a solution containing up to 28 percent by weight of polyurethane in an organic solvent miscible with water to one surface of a fibrous sheet material, applying a liquid precipitating agent to the layer at a temperature not in excess of 5° C., washing the resulting coagulated polymer layer, drying and cooling the polymer layer, and grinding the outer surface of the polymer layer.

2. A process according to claim 1 in which a polyurethane solution is employed in which up to 5 percent by weight of the polymer solids content is replaced by polyvinyl chloride.

3. A process according to claim 1 in which the top film of the polymer layer is split-off and the polymer layer is then ground to produce a nap.

4. A process according to claim 1 in which a polyester of 4,4'-dioxydibutylether and adipic acid is employed for the preparation of the polyurethane solution.

5. A process according to claim 1 in which the viscosity of the polymer solution is in the range of 5,000 to 60,000 cp.

6. A process according to claim 1 in which the polyurethane solution is applied at a wet-layer thickness of 1.5 mm.

7. A process according to claim 1 which is continuously performed.

References Cited

UNITED STATES PATENTS

| | | | |
|---|---|---|---|
| 3,483,015 | 12/1969 | Fukushima et al. | 161—DIG 12 |
| 3,520,767 | 7/1970 | Manwaring | 161—DIG 12 |
| 3,524,791 | 8/1970 | Bethman et al. | 161—DIG 12 |
| 3,041,193 | 6/1962 | Hamway et al. | 161—DIG 12 |

ROBERT F. BURNETT, Primary Examiner
L. KOECKERT, Assistant Examiner

U.S. Cl. X.R.

117—135.5, 140 R, 161 KP; 161—64